United States Patent
Kim et al.

(10) Patent No.: US 10,216,729 B2
(45) Date of Patent: Feb. 26, 2019

(54) TERMINAL DEVICE AND HANDS-FREE DEVICE FOR HANDS-FREE AUTOMATIC INTERPRETATION SERVICE, AND HANDS-FREE AUTOMATIC INTERPRETATION SERVICE METHOD

(71) Applicant: ELECTRONICS AND TELECOMMUNICATIONS RESEARCH INSTITUTE, Daejeon (KR)

(72) Inventors: Sang-Hun Kim, Daejeon (KR); Ki-Hyun Kim, Daejeon (KR); Ji-Hyun Wang, Sejong-si (KR); Dong-Hyun Kim, Daejeon (KR); Seung Yun, Daejeon (KR); Min-Kyu Lee, Daejeon (KR); Dam-Heo Lee, Daejeon (KR); Mu-Yeol Choi, Daejeon (KR)

(73) Assignee: ELECTRONICS AND TELECOMMUNICATIONS RESEARCH INSTITUTE, Daejeon (KR)

( * ) Notice: Subject to any disclaimer, the term of this patent is extended or adjusted under 35 U.S.C. 154(b) by 0 days.

(21) Appl. No.: 14/914,390

(22) PCT Filed: Apr. 30, 2014

(86) PCT No.: PCT/KR2014/003839
§ 371 (c)(1),
(2) Date: Feb. 25, 2016

(87) PCT Pub. No.: WO2015/030340
PCT Pub. Date: Mar. 5, 2015

(65) Prior Publication Data
US 2016/0210283 A1 Jul. 21, 2016

(30) Foreign Application Priority Data

Aug. 28, 2013 (KR) .................. 10-2013-0102267
Feb. 26, 2014 (KR) .................. 10-2014-0022712

(51) Int. Cl.
*G06F 17/28* (2006.01)
*H04M 1/60* (2006.01)
(Continued)

(52) U.S. Cl.
CPC ........ *G06F 17/289* (2013.01); *G06F 17/2854* (2013.01); *H04M 1/6041* (2013.01); *G10L 13/033* (2013.01); *G10L 15/00* (2013.01)

(58) Field of Classification Search
CPC .............................. G10L 15/30; G10L 15/26
See application file for complete search history.

(56) References Cited

U.S. PATENT DOCUMENTS 6,052,441 A    4/2000  Sato
6,161,082 A    12/2000 Goldberg et al.
(Continued)

FOREIGN PATENT DOCUMENTS

JP    2005-012833 A    1/2005
KR    10-2000-0072073 A    12/2000
(Continued)

OTHER PUBLICATIONS

Search Report for International Application No. PCT/KR2014/003839.
(Continued)

*Primary Examiner* — Jialong He
(74) *Attorney, Agent, or Firm* — LRK Patent Law Firm

(57) ABSTRACT

A user terminal, hands-free device and method for hands-free automatic interpretation service. The user terminal includes an interpretation environment initialization unit, an
(Continued)

interpretation intermediation unit, and an interpretation processing unit. The interpretation environment initialization unit performs pairing with a hands-free device in response to a request from the hands-free device, and initializes an interpretation environment. The interpretation intermediation unit sends interpretation results obtained by interpreting a user's voice information received from the hands-free device to a counterpart terminal, and receives interpretation results obtained by interpreting a counterpart's voice information from the counterpart terminal. The interpretation processing unit synthesizes the interpretation results of the counterpart into a voice form based on the initialized interpretation environment when the interpretation results are received from the counterpart terminal, and sends the synthesized voice information to the hands-free device.

12 Claims, 11 Drawing Sheets

(51) Int. Cl.
  *G10L 13/033* (2013.01)
  *G10L 15/00* (2013.01)

(56) References Cited

U.S. PATENT DOCUMENTS

| | | | | |
|---|---|---|---|---|
| 6,513,006 | B2* | 1/2003 | Howard | G10L 15/1822 348/E5.105 |
| 7,315,818 | B2* | 1/2008 | Stevens | G10L 15/22 704/235 |
| 7,421,387 | B2* | 9/2008 | Godden | G10L 15/08 704/200 |
| 7,664,639 | B2* | 2/2010 | Mochary | G10L 15/26 704/238 |
| 7,706,510 | B2* | 4/2010 | Ng | H04M 1/72552 379/88.14 |
| 8,340,975 | B1* | 12/2012 | Rosenberger | G10L 15/22 704/270 |
| 2003/0115059 | A1* | 6/2003 | Jayaratne | G06F 17/289 704/235 |
| 2003/0115068 | A1 | 6/2003 | Boesen | |
| 2005/0033571 | A1* | 2/2005 | Huang | G10L 15/20 704/231 |
| 2006/0170562 | A1* | 8/2006 | Choi | G10H 1/0008 340/573.1 |
| 2007/0143105 | A1* | 6/2007 | Braho | G10L 15/30 704/231 |
| 2007/0203987 | A1* | 8/2007 | Amis | G06Q 10/107 709/206 |
| 2007/0219802 | A1* | 9/2007 | Cook | G10L 15/30 704/270 |
| 2007/0239837 | A1* | 10/2007 | Jablokov | G06Q 30/0251 709/206 |
| 2008/0235024 | A1* | 9/2008 | Goldberg | G10L 13/033 704/260 |
| 2009/0099836 | A1* | 4/2009 | Jacobsen | G06F 17/289 704/3 |
| 2009/0177462 | A1* | 7/2009 | Alfven | G06F 17/289 704/3 |
| 2009/0204409 | A1* | 8/2009 | Mozer | G10L 15/30 704/275 |
| 2009/0259472 | A1* | 10/2009 | Schroeter | G10L 13/043 704/260 |
| 2009/0274299 | A1* | 11/2009 | Caskey | G06F 17/289 380/255 |
| 2010/0105435 | A1* | 4/2010 | Ueda | H04M 1/0245 455/563 |
| 2010/0131260 | A1* | 5/2010 | Bangalore | G06F 17/279 704/3 |
| 2010/0185432 | A1* | 7/2010 | Almagro | H04R 5/033 704/2 |
| 2010/0185434 | A1* | 7/2010 | Burvall | G06F 17/289 704/3 |
| 2010/0235161 | A1 | 9/2010 | Kim et al. | |
| 2010/0304783 | A1* | 12/2010 | Logan | H04M 1/6066 455/552.1 |
| 2011/0301936 | A1* | 12/2011 | Yun | G06F 17/289 704/2 |
| 2011/0307241 | A1* | 12/2011 | Waibel | G10L 15/265 704/2 |
| 2012/0123776 | A1* | 5/2012 | Agapi | G10L 21/0208 704/233 |
| 2012/0166176 | A1 | 6/2012 | Nakamura et al. | |
| 2012/0197629 | A1 | 8/2012 | Nakamura et al. | |
| 2012/0221321 | A1 | 8/2012 | Nakamura et al. | |
| 2013/0013297 | A1* | 1/2013 | Song | H04M 1/72552 704/201 |
| 2013/0104090 | A1* | 4/2013 | Yu | G06F 3/0487 715/863 |
| 2013/0297288 | A1* | 11/2013 | Ehsani | G06F 17/289 704/3 |
| 2013/0325434 | A1* | 12/2013 | Boesen | G10L 15/005 704/2 |
| 2016/0210960 | A1* | 7/2016 | Kim | H04W 4/18 |

FOREIGN PATENT DOCUMENTS

| | | |
|---|---|---|
| KR | 10-2002-0054192 A | 7/2002 |
| KR | 10-2006-0088275 A | 8/2006 |
| KR | 10-2010-0068965 A | 6/2010 |
| KR | 10-2010-0102480 A | 9/2010 |
| KR | 10-2011-0065916 A | 6/2011 |
| KR | 10-2012-0040190 A | 4/2012 |
| KR | 10-2012-0107933 A | 10/2012 |
| KR | 10-2013-0043293 A | 4/2013 |
| KR | 10-2013-0052862 A | 5/2013 |
| WO | 2011/040056 A1 | 4/2011 |

OTHER PUBLICATIONS

Chai Wutiwiwatchai et al., "Thai ASR Development for Network-Based Speech Translation," Oriental Cocosda, 2012.
Hori Chiori, "International Standardization of the Networkbased Speech-to-Speech Translation Technologies and Expansion of the Standardization Technologies by the International Research Collaborations," Journal of the National Institute of Information and Communications Technology, 2012.

* cited by examiner

TERMINAL DEVICE AND HANDS-FREE DEVICE FOR HANDS-FREE AUTOMATIC INTERPRETATION SERVICE, AND HANDS-FREE AUTOMATIC INTERPRETATION SERVICE METHOD

TECHNICAL FIELD

The present invention relates to a user terminal, hands-free device and method for hands-free automatic interpretation service and, more particularly, to technology for supporting automatic interpretation between users using a hands-free device and a user terminal.

BACKGROUND ART

A conventional automatic interpretation method using a smart phone is disadvantageous in that a user has to use both hands because he or she has to run an automatic interpretation app by touching the interface of the screen of the automatic interpretation app while holding a smart phone with his or her hands. Meanwhile, users frequently have to use both hands in order to carry bags or show passports while traveling. In such situations, the inconvenience that is caused by performing the interpretation using a smart phone while holding the smart phone with both hands is a factor that detracts from the utility of the automatic interpretation method in spite of its very useful automatic interpretation function. Furthermore, automatic interpretation using a smart phone is commonly performed in the form of bidirectional automatic interpretation in which a first person gives his or her smart phone to a second person, the second person speaks using the smart phone and the first person listens to a synthesized voice output from the smart phone. This is a factor that makes the bidirectional automatic interpretation unnatural.

Korean Patent Application Publication No 10-2010-0068965 discloses an automatic interpretation apparatus and method. As described above, there is a need for automatic interpretation technology using a hands-free method for resolving inconvenience in the use of automatic interpretation in a typical smart phone environment.

DISCLOSURE

Technical Problem

Accordingly, the present invention has been made keeping in mind the above problems occurring in the prior art, and an object of the present invention is to provide a user terminal, hands-free device and method for providing service that enables automatic interpretation to be conveniently performed using a hands-free method.

Technical Solution

In accordance with an aspect of the present invention, there is provided a user terminal for hands-free automatic interpretation service, including an interpretation environment initialization unit configured to perform pairing with a hands-free device in response to a request from the hands-free device, and to initialize an interpretation environment; an interpretation intermediation unit configured to send interpretation results obtained by interpreting a user's voice information received from the hands-free device to a counterpart terminal, and to receive interpretation results obtained by interpreting a counterpart's voice information from the counterpart terminal; and an interpretation processing unit configured to synthesize the interpretation results of the counterpart into a voice form based on the initialized interpretation environment when the interpretation results are received from the counterpart terminal, and to send the synthesized voice information to the hands-free device.

The interpretation environment initialization unit may include an environment information reception unit configured to receive interpretation environment information, including one or more of pieces of information about a language and gender of the counterpart, from the counterpart terminal; and an interpretation environment setting unit configured to set interpretation environment information, including one or more of information about an interpretation language and voice classification information, based on the received interpretation environment information.

The interpretation processing unit may include a voice synthesis unit configured to synthesize the interpretation results into a male or female voice based on the set voice classification information when the interpretation results are received from the counterpart terminal.

When additional information is further received from the counterpart terminal, the voice synthesis unit may synthesize the interpretation results into a male or female voice based on one or more of an articulation speed and emotional state of the user into the interpretation results based on the received additional information.

The user terminal may further include an additional information collection unit configured to collect additional information including one or more of user state information and personal information, the user state information may include one or more of an articulation speed and an emotional state extracted from the user's voice information, and the personal information includes one or more of information about a name, nationality and an image input by the user.

The interpretation intermediation unit may include a server intermediation unit configured to send the voice information to an interpretation server when the voice information is received from the hands-free device, and to receive the interpretation results from the interpretation server; and a terminal intermediation unit configured to send the received interpretation results to the counterpart terminal in accordance with a predetermined interpretation protocol.

The user terminal may further include a situation information collection unit configured to collect situation information including one or more of information about a current location of the user and information about a background sound, and the server intermediation unit may send the voice information received from the hands-free device and the collected situation information to the interpretation server.

The interpretation results obtained by interpreting the user's voice information may include one or more of interpretation data, corresponding to the voice information interpreted in a text or voice form, and interpretation error correction data, and the error correction data may include one or more of similarly intended sentences and N-best recognition data.

The interpretation processing unit may include an interpretation correction unit configured to, if the error correction data is included in the interpretation results, correct the interpretation data based on one or more pieces of information that belong to the error correction data and that are selected by the user.

In accordance with another aspect of the present invention, there is provided a method for hands-free automatic interpretation service, the method being performed by a user terminal, the method including performing pairing with a hands-free device in response to a request from the hands-free device, and initializing an interpretation environment; sending received voice information to an interpretation server when the voice information of a user is received from the hands-free device, and receiving interpretation results from the interpretation server; sending the received interpretation results to a counterpart terminal; receiving interpretation results obtained by interpreting a counterpart's voice information from the counterpart terminal; synthesizing the interpretation results received from the counterpart terminal into a voice form based on the initialized interpretation environment; and sending the synthesized voice information to the hands-free device.

Initializing the interpretation environment may include receiving interpretation environment information, including one or more of pieces of information about a language and gender of the counterpart, from the counterpart terminal; and setting interpretation environment information, including one or more of information about an interpretation language and voice classification information, based on the received interpretation environment information.

Synthesizing the interpretation results into the voice may include, when the interpretation results are received from the counterpart terminal, synthesizing the interpretation results into a male or female voice based on the set voice classification information.

Synthesizing the interpretation results into the voice may include, when the additional information is further received from the counterpart terminal, synthesizing the interpretation results based on received additional information based on one or more of an articulation speed and emotional state of the user into the interpretation results.

The method may further include collecting situation information including one or more of information about a current location of the user and information about a background sound, and sending the received voice information of the user to the interpretation server may include sending the voice information, received from the hands-free device, and the collected situation information to the interpretation server.

The method may further include, if the error correction data is included in the interpretation results received from the interpretation server, outputting error correction data to a display; receiving one or more pieces of selection information, belonging to the error correction data, from the user; and correcting interpretation data based on the received selection information.

In accordance with still another aspect of the present invention, there is provided a hands-free device for hands-free automatic interpretation service including a microphone and a speaker, the hands-free device including an interpretation function performance unit configured to perform pairing with a user terminal in response to an interpretation request from a user, and to request the user terminal to initialize an interpretation environment; and a control unit configured to control a communication unit so that the communication unit sends voice information of the user, received via the microphone, to the user terminal, and to control the communication unit so that the communication unit outputs voice information, received from the user terminal, via the speaker.

The interpretation function performance unit may run an interpretation app installed on the user terminal and request the user terminal to initialize the interpretation environment, in response to the interpretation request from the user.

The interpretation function performance unit may detect a counterpart terminal, that is, an object terminal of interpretation at a close location, and may send information about the detected counterpart terminal to the user terminal via the communication unit so that an interpretation environment with the counterpart terminal is initialized.

The hands-free device may further include a motion recognition unit configured to recognize a motion of the user using a motion recognition sensor using one or more of an acceleration sensor and a gyro sensor, and the control unit may control a selection of error correction data output to a display of the user terminal based on the recognized motion.

The microphone may include one or more of a first microphone placed near a mouth of the user, a second microphone placed near an ear of the user and a bone conduction microphone.

Advantageous Effects

In accordance with the present invention, a natural interpretation service can be provided and also user convenience can be improved because an automatic interpretation service is provided using a hands-free method and thus a complete multi-modal method, such as a gesture input using both hands, is enabled.

Furthermore, background noise resistant automatic interpretation can be provided, and interpretation performance can be improved because an interpretation service is provided using information about the current situation of a user or additional information, such as articulation speed or an emotional state.

MODE FOR INVENTION

Figure 1:
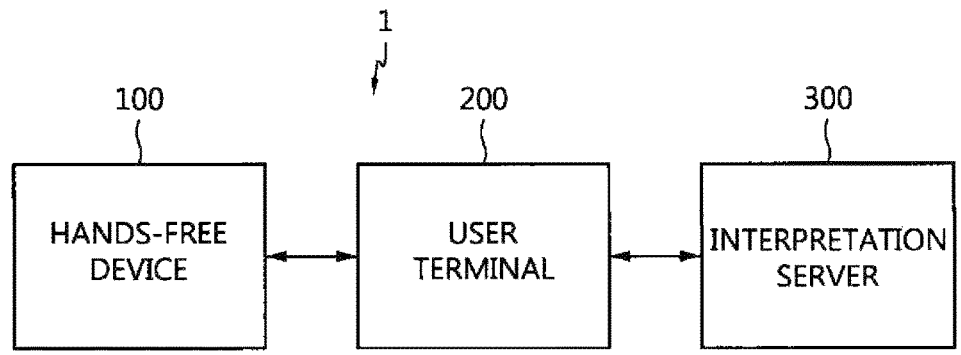
FIG. 1 is a block diagram of a system for hands-free automatic interpretation according to an embodiment of the present invention.

Reference now should be made to the drawings, throughout which the same reference numerals are used to designate the same or similar components.

Embodiments of a user terminal, hands-free device and method for hands-free automatic interpretation service are described in detail below with reference to the accompanying drawings.

Figure 2:
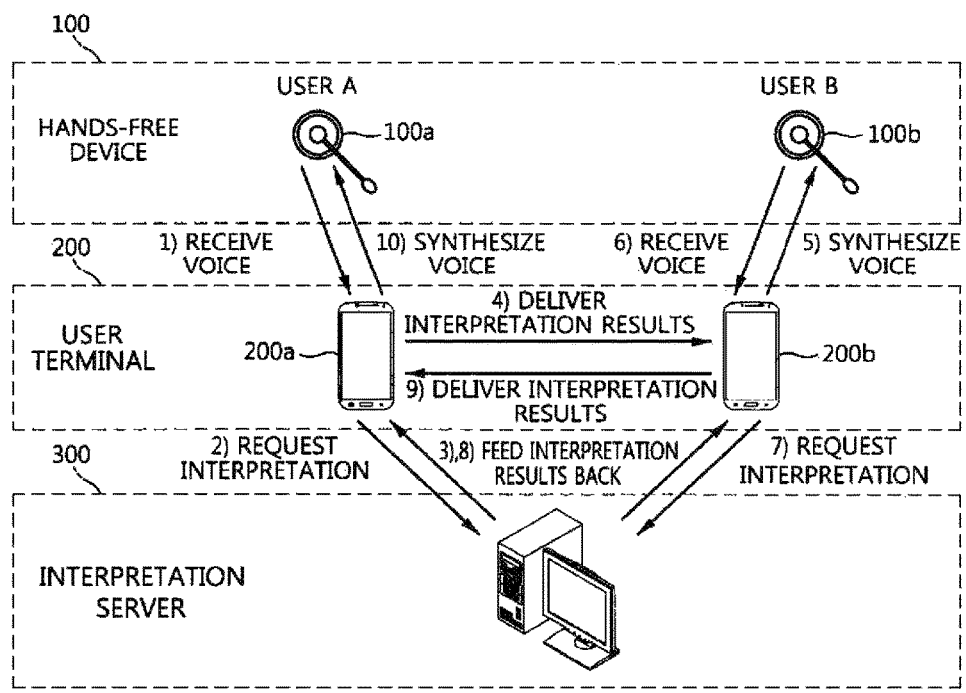
FIGS. 2 and 3 schematically illustrate the flow of automatic interpretation that is performed by the automatic interpretation system according to embodiments of the present invention.
Figure 3:
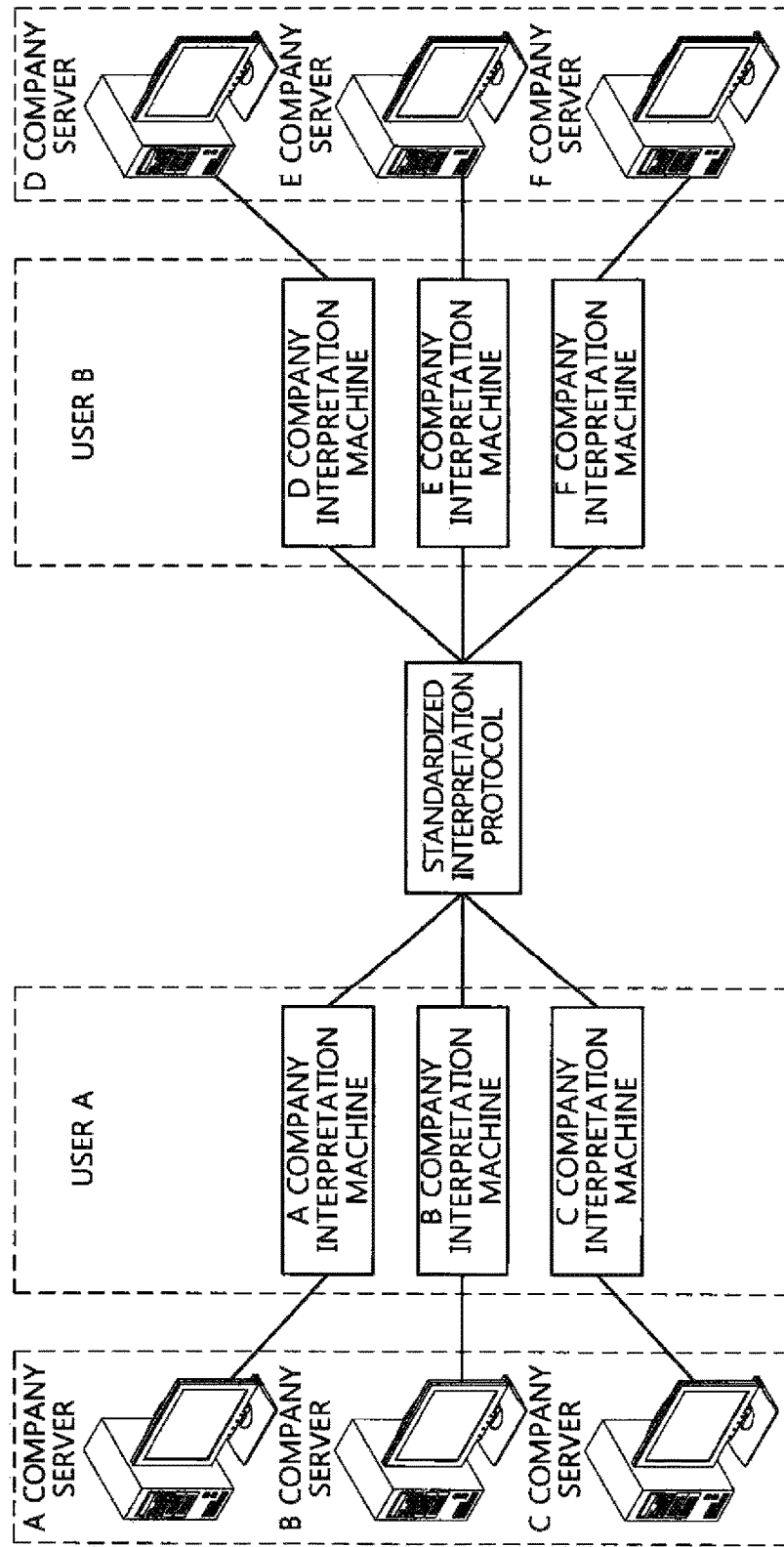

FIG. 1 is a block diagram of a system 1 for hands-free automatic interpretation according to an embodiment of the present invention. FIGS. 2 and 3 schematically illustrate the flow of automatic interpretation that is performed by the automatic interpretation system according to embodiments of the present invention.

Referring to FIG. 1, the system 1 for hands-free automatic interpretation according to an embodiment of the present invention may include a hands-free device 100, a user terminal 200, and an interpretation server 300.

Referring to FIG. 1, the hands-free device 100 performs pairing with the user terminal 200 of a user in order to provide automatic interpretation. The hands-free device 100 may perform pairing with the user terminal 200 using a short-distance communication method, such as Bluetooth, ZigBee, near field communication (NFC), Wi-Fi or Wi-Fi Direct.

When an interpretation request is received from the user, the hands-free device 100 may automatically run an interpretation app installed on the user terminal 200, and may request the initialization of an interpretation environment.

Once the interpretation initialization of the user terminal 200 has been completed, the hands-free device 100 receives voice information for interpretation from the user, and requests interpretation from the user terminal 200 by sending the voice information to the user terminal 200. Furthermore, the hands-free device 100 may receive a synthesized voice, obtained by synthesizing the interpretation results of a counterpart, into a voice, from the user terminal 200, and may output the synthesized voice to the user.

In response to the request from the hands-free device 100, the user terminal 200 may initialize a communication connection with a counterpart terminal and an interpretation environment. The user terminal 200 may include various communication user terminals, such as a smart phone, a smart pad, and a laptop. In this case, the user terminal 200 may perform pairing with the counterpart terminal via short-distance communication, such as Bluetooth, Wi-Fi or Wi-Fi Direct communication, may receive required initialization environment information, for example, information about the language and gender of the counterpart from the counterpart terminal, and initialize the interpretation environment based on the received initialization environment information.

Furthermore, when the voice information for interpretation is received from the hands-free device 100, the user terminal 200 may request interpretation from the interpretation server 300 by sending the received voice information to the interpretation server 300.

As illustrated in FIG. 2, users may access the same automatic interpretation server 300 via the hands-free devices 100 and the user terminals 200, and may use automatic interpretation service. That is user A may access the interpretation server 300 using his or her hands-free device 100a and terminal 200a, and user B may access the same interpretation server 300 using his or her hands-free device 100b and user terminal 200b. In this case, the hands-free device 100 may be worn by any one of both users.

In accordance with another embodiment, as illustrated in FIG. 3, users A and B may access respective preferred interpretation servers, may make interpretation requests and receive results, and may send the received interpretation results to counterparts in accordance with a standardized interpretation protocol.

The user terminal 200 may access the interpretation server 300 via wireless mobile communication. In this case, the wireless mobile communication may include 3G, LTE and LTE Advanced communication, but is not limited to a specific communication method. It will be apparent that various communication methods that will be developed in the future thanks to the development of technology may be used Furthermore, the user terminal 200 may collect information about the current situation of the user using various sensors (e.g., a GPS) mounted thereon, and may send the collected information to the interpretation server 300.

Furthermore, when the voice information is received from the hands-free device 100, the user terminal 200 may obtain additional information, such as articulation speed or an emotional state, from the voice information, and may send the obtained additional information to the counterpart terminal along with the interpretation results received from the interpretation server 300.

Furthermore, when the interpretation results of the voice information input by the counterpart are received from the counterpart terminal, the user terminal 200 may synthesize the interpretation results into a voice form using the received interpretation results. In this case, the user terminal 200 may synthesize the interpretation results in accordance with the voice of a corresponding gender based on information about the gender (i.e., male or female) of the counterpart set when the interpretation environment is initialized. Furthermore, when the additional information is received from the counterpart terminal, the user terminal 200 may generate the synthesized voice by incorporating the received additional information into the synthesized voice.

When the voice information is received from the user terminal 200, the interpretation server 300 may recognize the received voice, may convert the recognized voice into text, and may translate the converted text in accordance with the language of the counterpart. Furthermore, the interpretation server 300 may convert the translated results into text or voice form, and may send the converted interpretation results to the user terminal 200. In this case, when the situation information, together with the voice information, is received from the user terminal 200, the interpretation server 300 may determine information about the current situation of the user, and may translate the voice information in accordance with the determined situation.

Figure 4:
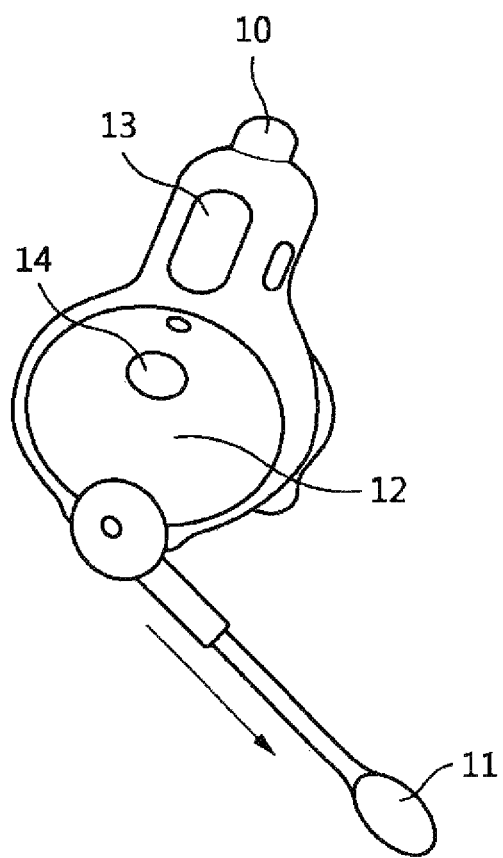
FIGS. 4 and 5 illustrate the structures of hands-free devices according to embodiments of the present invention.
Figure 5:
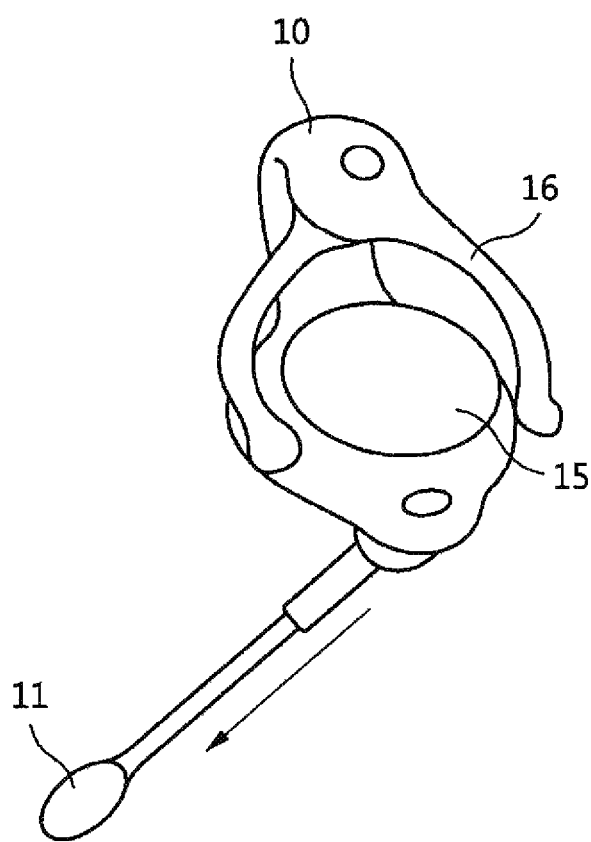

FIGS. 4 and 5 illustrate the structures of hands-free devices 10 according to embodiments of the present invention.

The hands-free devices 10 of FIGS. 4 and 5 are embodiments of the hands-free device 100 of FIG. 1, and may be fabricated in a form that may be worn by a user, in particular, in a form that may be worn on the ears of a person.

Referring to FIGS. 4 and 5, the hands-free devices 10 may include microphones 11 and 12, a volume control button 13, and a push to talk (PTT) button 14, or may include microphones 11 and 16, and a speaker 15.

As illustrated in FIG. 4, the hands-free device 10 may receive a user's voice via two channels, that is, channel 1, that is, the microphone 11 placed near the mouse, and channel 2, that is, the microphone 12 placed near an ear. Accordingly, the success rate of voice recognition can be improved even in a high noise environment because the user terminal 200 or the interpretation server 300 that receives a voice via the two channels as described above may perform two-channel noise processing.

In this case, the microphone 11 of the channel 1 may be fabricated in a spring or retractable form so that the length of the microphone 11 may be controlled depending on the shape of a user's body.

As illustrated in FIG. 5, the hands-free device 10 may include a bone conduction microphone 16 in addition to the microphone 11. The bone conduction microphone 16 may form channel 3 in addition to the microphone 11 and 12 of the channels 1 and 2, or may be formed separately from the microphones 11 and 12. As illustrated in FIG. 5, the bone conduction microphone 16 may be formed in the shape of a ring to be hung on the earflap part of an ear, and may be configured to receive a bone conduction voice so that it may be used to detect the end point of a voice received from the user terminal 200.

In accordance with the embodiment of FIG. 4, the hands-free device 10 may include the PTT button 14. A user may request interpretation by pressing the PTT button 14 whenever the user speaks, thereby being able to conveniently input a voice. Accordingly, the user terminal 200 may detect the start and end points of the voice more easily. In this case, the PTT button 14 may be omitted if the bone conduction microphone 16 is formed, as illustrated in FIG. 5.

The speaker 15 outputs synthesized sound information, corresponding to interpretation results received from the user terminal 200, to a user. Furthermore, the volume control button 13 controls the volume output to a user in response to a request from the user.

Furthermore, although not illustrated in FIGS. 4 and 5, the hands-free device 10 may have a motion recognition sensor, such as a gyro sensor or an acceleration sensor, contained therein. The hands-free device 10 may control an interface output to the user terminal 200 in response to a motion recognized by the embedded motion recognition sensor.

Figure 6:
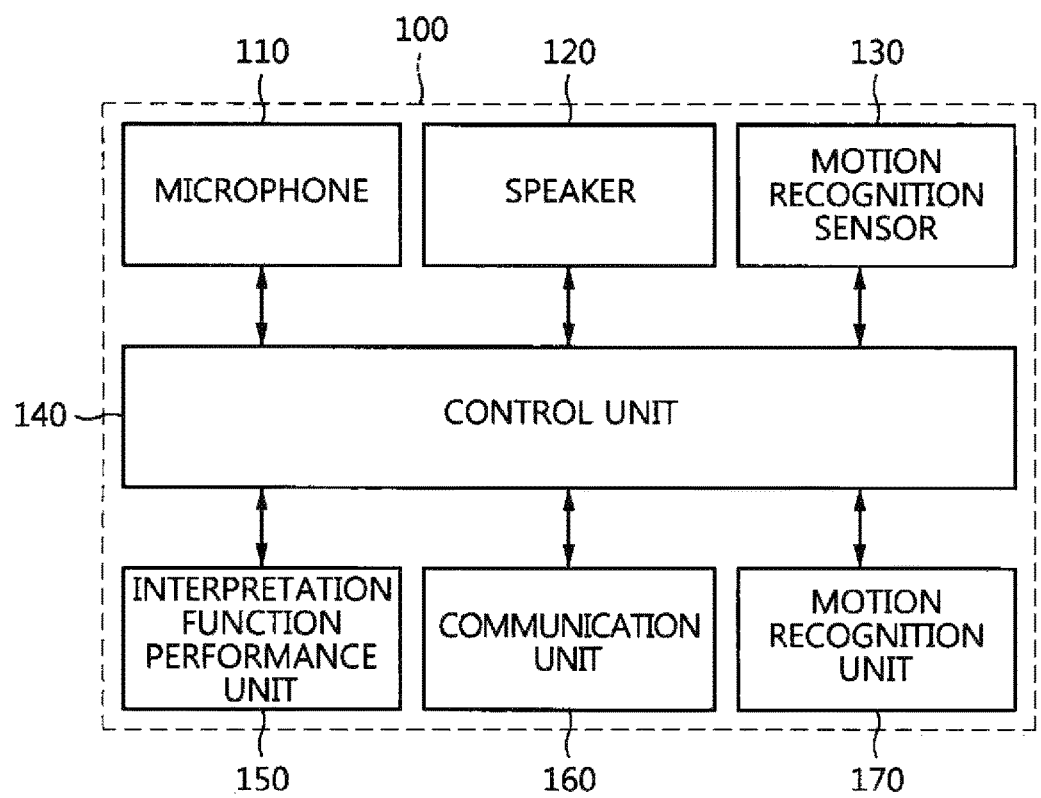
FIG. 6 is a block diagram of the hands-free device for hands-free automatic interpretation according to an embodiment of the present invention.

FIG. 6 is a block diagram of the hands-free device for hands-free automatic interpretation according to an embodiment of the present invention, The hands-free device 100 for automatic interpretation is described in more detail below with reference to FIG. 6. The hands-free device 100 may include a microphone 110, a speaker 120, a motion recognition sensor 130, a control unit 140, an interpretation function performance unit 150, a communication unit 160, and a motion recognition unit 170.

The control unit 140 performs the various control operations of the hands-free device 100. For example, when a user inputs a predefined interpretation start request voice (e.g., "interpretation start") via the microphone 110, the control unit 140 may recognize the received voice and determine whether or not the recognized voice is an interpretation request. If, as a result of the determination, it is determined that the recognized voice is an interpretation request, the control unit 140 may request the interpretation function performance unit 150 to perform its interpretation function. Alternatively, when an interpretation request button mounted on the hands-free device 100 is clicked on, the control unit 140 may recognize an interpretation request and request the interpretation function performance unit 150 to perform the interpretation function.

Once the performance of the interpretation function according to an interpretation start request from a user has been completed or the interpretation function has been terminated in response to an interpretation termination request from the user, the control unit 140 may output a predefined sound effect via the speaker 120. Accordingly, the user may recognize that the interpretation function had been performed, and may input voice information to be interpreted.

Furthermore, when the interpretation is completed, that is, a predefined interpretation termination request voice (e.g., "interpretation termination") is received from the user, the control unit 140 may recognize the interpretation termination request voice, and may determine whether the recognized interpretation termination request voice is a voice indicative of an interpretation termination request. If, as a result of the determination, it is determined that the recognized interpretation termination request voice is an interpretation termination request, the control unit 140 may automatically terminate the interpretation app of the user terminal 200.

The interpretation function performance unit 150 may notify the user terminal 200 connected to the hands-free device 100 that an interpretation request has been received under the control of the control unit 140, and may request the user terminal 200 to initialize an interpretation environment.

For example, the interpretation function performance unit 150 may perform pairing with the user terminal 200 via short-distance communication. Furthermore, when the hands-free device 100 is connected to the user terminal 200, the interpretation function performance unit 150 may automatically run an interpretation app installed on the user terminal 200 so that the user terminal 200 initializes a required interpretation environment.

In this case, the user terminal 200 may perform pairing with a counterpart terminal, may establish a connection with the interpretation server 300, and may set environment information, such as information about the language and gender of a counterpart, in response to a request from the interpretation function performance unit 150.

When an interpretation request is received, the interpretation function performance unit 150 may detect a counterpart terminal at a close location (e.g., within a radius of 2 m), that is, the object terminal of interpretation, and may send information about the detected counterpart terminal to the user terminal 200 via the communication unit 160.

When an interpretation environment initialization request including the information about the counterpart terminal is received from the interpretation function performance unit 150, the user terminal 200 may establish a connection with the counterpart terminal using the information about the counterpart terminal, and may receive required environment information from the counterpart terminal. In this case, the user terminal 200 and the counterpart terminal may be connected via Bluetooth pairing.

Furthermore, when a user inputs voice information to be interpreted via the microphone 110 after the interpretation function has been run, the control unit 140 may control the communication unit 160 so that the received voice information is transmitted to the user terminal 200. When the communication unit 160 receives synthesized sound information, that is, the interpretation results of a counterpart's voice information, from the user terminal 200, the control unit 140 may control the speaker 120 so that synthesized sound information is output to the user.

Furthermore, the control unit 140 may control the motion recognition sensor 130, such as a gyro sensor or an acceleration sensor, and the motion recognition unit 170 so that a signal measured by the motion recognition sensor 130 is recognized as a predefined motion via the motion recognition unit 170. Furthermore, the control unit 140 may control a user's selection in an interface that is output to the display of the user terminal 200 based on the recognized motion.

For example, when a user wears the hands-free device 100 on his or her ears and moves his or her head up and down, the control unit 140 may move the selection of a menu option or item (e.g., error correction data), output to the interface of the user terminal 200, up and down in response to the movement. When the user nods rapidly or moves his or her head to the left and right in the state in which a specific menu option or item has been selected, the control unit 140 may input the selected menu option or item as a menu option or item that has been finally selected by the user.

That is, when the user terminal 200 receives interpretation results and error correction data, such as N-best recognition results or similarly intended sentences, from the interpretation server 300 and outputs the error correction data to the display of the user terminal 200, the user may easily input correction data without requiring a need to directly touch the user terminal 200 using his or her hand.

Figure 7:
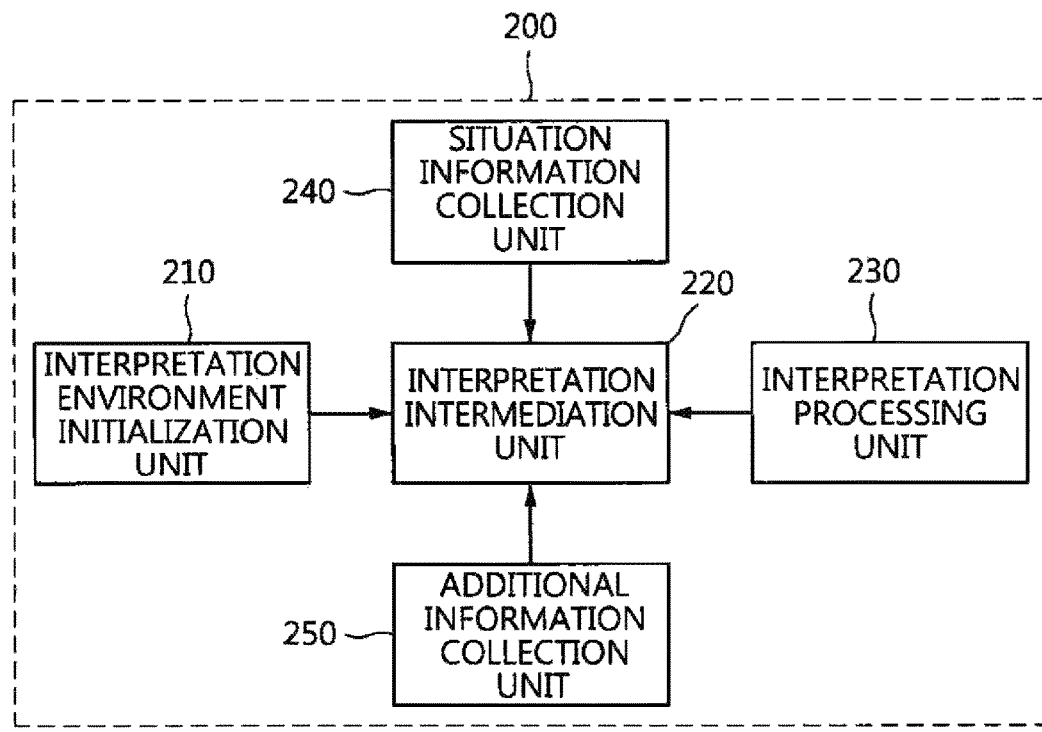
FIG. 7 is a block diagram of a user terminal for hands-free automatic interpretation according to an embodiment of the present invention.
Figure 8:
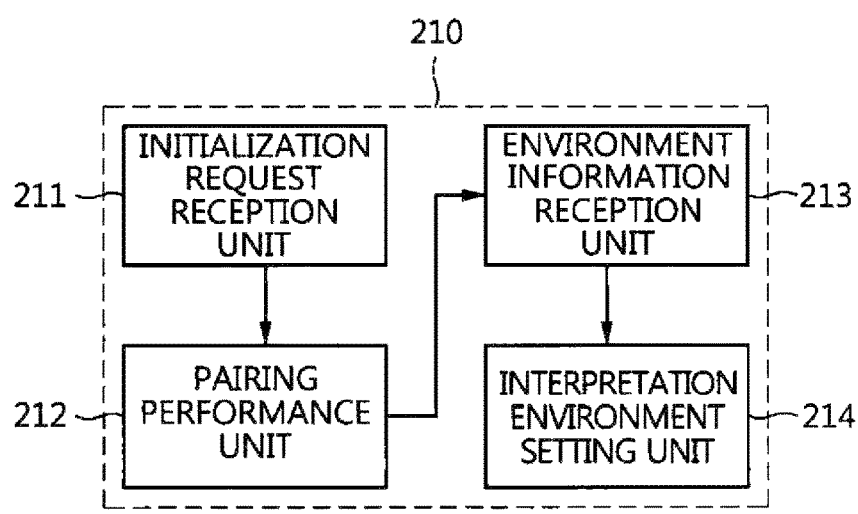
FIG. 8 is a detailed block diagram of the interpretation environment initialization unit of the user terminal of FIG. 7.
Figure 9:
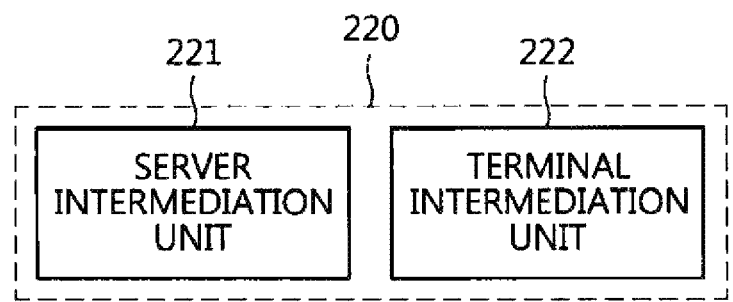
FIG. 9 is a detailed block diagram of the interpretation intermediation unit of the user terminal of FIG. 7.
Figure 10:
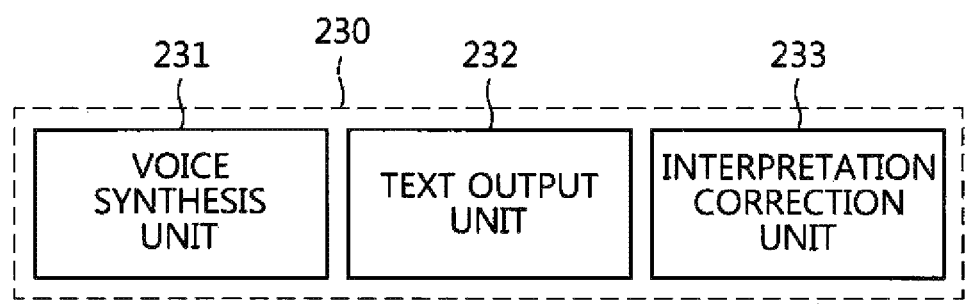
FIG. 10 is a detailed block diagram of the interpretation processing unit of the user terminal of FIG. 7.

FIG. 7 is a block diagram of the user terminal 200 for hands-free automatic interpretation according to an embodiment of the present invention, FIG. 8 is a detailed block diagram of the interpretation environment initialization unit of the user terminal 200 of FIG. 7, FIG. 9 is a detailed block diagram of the interpretation intermediation unit of the user terminal 200 f FIG. 7 FIG. 10 is a detailed block diagram of the interpretation processing unit of the user terminal 200 of FIG. 7.

The user terminal 200 for hands-free automatic interpretation is described below with reference to FIGS. 7 to 10. The user terminal 200 may include an interpretation environment initialization unit 210, an interpretation intermediation unit 220, an interpretation processing unit 230, a situation information collection unit 240 and an additional information collection unit 250.

The interpretation environment initialization unit 210 may perform pairing with the hands-free device 100 in response to a request from the hands-free device and initialize an interpretation environment. In this ease, the interpretation environment information may include information about the language and gender (i.e., a male or female) of a counterpart user.

The interpretation environment initialization unit 210 is described in more detail below with reference to FIG. 8. The interpretation environment initialization unit 210 may include an initialization request reception unit 211, a pairing performance unit 212, an environment information reception unit 213 and an interpretation environment setting unit 214.

The initialization request reception unit 211 receives an interpretation environment initialization request from the hands-free device 100. In this case, as described above, the hands-free device 100 may automatically run an interpretation app installed on the user terminal 200. When the interpretation app is automatically run, the initialization request reception unit 211 may recognize such automatic running as the interpretation environment initialization and interpretation request of the hands-free device 100.

When the initialization request reception unit 211 receives the interpretation environment initialization request, the pairing performance unit 212 may access a mobile communication network and connect to a predetermined interpretation server or a preferred interpretation server. Furthermore, the pairing performance unit 212 may send a pairing request to a counterpart terminal via short-distance communication, such as Bluetooth, and may connect to the counterpart terminal when a pairing approval is received from the counterpart terminal.

When the interpretation server 200 and the counterpart terminal are connected by the pairing performance unit 212, the environment information reception unit 213 may receive information about the language and gender of the counterpart from the counterpart terminal.

In accordance with an additional embodiment, the interpretation environment initialization unit 210 may further include an environment information transmission unit (not shown) configured to receive environment information, such as information about the language or gender of a user, from the user via an interface provided to the user or to send predetermined environment information to the counter terminal of a counterpart. Since the user terminal 200 may be used by a plurality of users depending on the circumstance, an interface for receiving environment information may be provided to a user when an interpretation request is received from the hands-free device 100. The required environment information may be received from the user via the interface and transmitted to a counterpart terminal. In this case, as described above, the hands-free device 100 may run an interpretation app installed on the user terminal 200. Once the interpretation app has been run, environment information required for interpretation may be received via the interface provided by the interpretation app.

When information about the language and gender of a counterpart is received from the counterpart terminal and the environment information including the information about the language and gender of the counterpart is received, the interpretation environment setting unit 214 may set an interpretation environment, such as an interpretation language and a synthesized voice, using the received environment information.

Once the interpretation environment has been set, the interpretation intermediation unit 220 may receive the user's voice information to be interpreted from the hands-free device 100 and send interpretation results, corresponding to the voice information to be interpreted to the counterpart terminal. Furthermore, the interpretation intermediation unit 220 may receive interpretation results, corresponding to the counterpart's voice information, from the counterpart terminal.

Referring to FIG. 9, the interpretation intermediation unit 220 according to an embodiment of the present invention may include a server intermediation unit 221 and a terminal intermediation unit 222, and may perform interpretation via the interpretation server 300, but the present invention is not limited thereto. For example, if an interpretation function is embedded in the user terminal 200, a user's voice information may be directly interpreted in accordance with the language of a counterpart using the interpretation function without intervention of the interpretation server 300.

When the user's voice information to be interpreted is received from the hands-free device 100, the server intermediation unit 221 may request interpretation by sending the received voice information to the interpretation server 300. In this case, the server intermediation unit 221 may check information about the language of the user and information about the language of the counterpart that belong to predetermined interpretation environment information, and may send the checked information along with the voice information to be interpreted.

When the user's voice information starts to be received from the hands-free device 100, the server intermediation unit 221 detects the start and end points of the voice. When the end point of the voice is detected, the server intermediation unit 221 may send corresponding voice information to the interpretation server 300. If voice information is received via the bone conduction microphone or the PTT button mounted on the hands-free device 100, the server intermediation unit 221 may easily detect the start and end points of the voice information.

Furthermore, the server intermediation unit 221 may receive the interpretation results of the user's voice information, corresponding to the language of the counterpart, from the interpretation server 300. In this case, the interpretation results may include interpretation data of a text or voice form that has been interpreted from the user's voice information into the language of the counterpart, and may further include one or more pieces error correction data, such as similarly intended sentences or N-best recognition results.

When the interpretation results of the user's voice information are received from the interpretation server 300, the terminal intermediation unit 222 may send the received interpretation results to the counterpart terminal. In this case, the terminal intermediation unit 222 may exchange interpretation results with the counterpart terminal in accordance with a predetermined interpretation protocol. Furthermore, the terminal intermediation unit 222 may receive the interpretation results of the counterpart's voice information from the counterpart terminal.

Referring back to FIG. 7, when the interpretation environment is initialized by the interpretation environment initialization unit 210, the situation information collection unit 240 may collect information about the current situation of the user. For example, the situation information collection unit 240 may collect information about the current location of the user or information about the background sound of a location (e.g., an airport, a restaurant, a hotel or a street) where the user is placed using a microphone or a location measurement sensor, such as a GPS sensor that is embedded in the user terminal 200 or externally connected to the user terminal 200.

When the information about the current situation of the user is collected by the situation information collection unit 240, the interpretation intermediation unit 220 may send the collected situation information to the interpretation server 300. Accordingly, interpretation can be performed more precisely by performing the interpretation while considering information about the current situation of a user as described above.

Furthermore, the additional information collection unit 250 may collect information about the state of the user as additional information. For example, when a user's voice information is received from the hands-free device 100, the additional information collection unit 250 may extract the articulation speed or emotional state of the user by analyzing the received user's voice information. Information about the articulation speed (i.e., an articulation speed ratio) may be obtained by measuring the length of a vowel within a syllable based on the voice information and comparing the measured length of the vowel with the length of a vowel in a predefined normal state. Information about the emotional state may be obtained by extracting the high and low of a sentence pitch, sentence articulation speed and an average sound level according to each articulation without requiring a need to predict the emotional state using a separate statistical model. However, the present invention is not limited to the above examples, and a variety of known methods may be used.

Furthermore, the additional information collection unit 250 may collect a user's personal information as the additional information. The additional information collection unit 250 may receive information about an image, name, and nationality of a user from the user via an interface provided to the user.

When the additional information is collected by the additional information collection unit 250, the interpretation intermediation unit 220 may send the collected additional information to the counterpart terminal along with the interpretation results.

The interpretation processing unit 230 may process the interpretation results received from the interpretation server 300 or the interpretation results received from the counterpart terminal, and may send the processed interpretation results to the hands-free device 100 or the counterpart terminal.

The interpretation processing unit 230 is described in more detail below with reference to FIG. 10. The interpretation processing unit 230 may include a voice synthesis unit 231, a text output unit 232 and an interpretation correction unit 233.

When the interpretation results are received from the counterpart terminal, the voice synthesis unit 231 may synthesize the interpretation results into a male or female voice using voice classification information set based on the information about the gender of the counterpart.

Furthermore, when the additional information, together with the interpretation results, is received from the counterpart terminal, the voice synthesis unit 231 may incorporate the additional information into the synthesized voice. For example, when information about articulation speed that belongs to the additional information is received, the voice synthesis unit 231 may incorporate the articulation speed into the synthesized male or female voice. Furthermore, when information about an emotional state that belongs to the additional information is received, the voice synthesis unit 231 may incorporate the high and low of a sentence pitch, sentence articulation speed, and an average sound level, of the information about the emotional state, into the rhythm control parameters of a voice synthesizer.

If the hands-free device 100 is not connected to the user terminal 200, the voice synthesis unit 231 may output the synthesized voice via a speaker embedded in the user terminal 200.

The text output unit 232 may output the interpretation results of the counterpart to the display of the user terminal 200 in text form so that the user may visually check the interpretation results. That is, the user terminal 200 has been illustrated as being connected to the hands-free device 100, but a user or a counterpart may use the interpretation function without the help of the hands-free device 100. If the hands-free device 100 is not connected to the user terminal 200 as described above, the text output unit 232 may output the interpretation results to a display in a text form.

If error correction data, such as similarly intended sentences or N-best recognition results, is included in the interpretation results received from the interpretation server 300, the interpretation correction unit 233 may output the error correction data to the interface of the display of the user terminal 200 so that the user may correct interpretation error.

When the user selects the most appropriate data of the error correction data output to the interface, the interpretation correction unit 233 may correct interpretation data of the interpretation results using the selected data so that the interpretation intermediation unit 220 sends the corrected interpretation data to the counterpart terminal. In this case, the user may select the error correction data output to the interface of the user terminal 200 by performing a motion in the state in which the user has worn the hands-free device 100 as described above.

Figure 11:
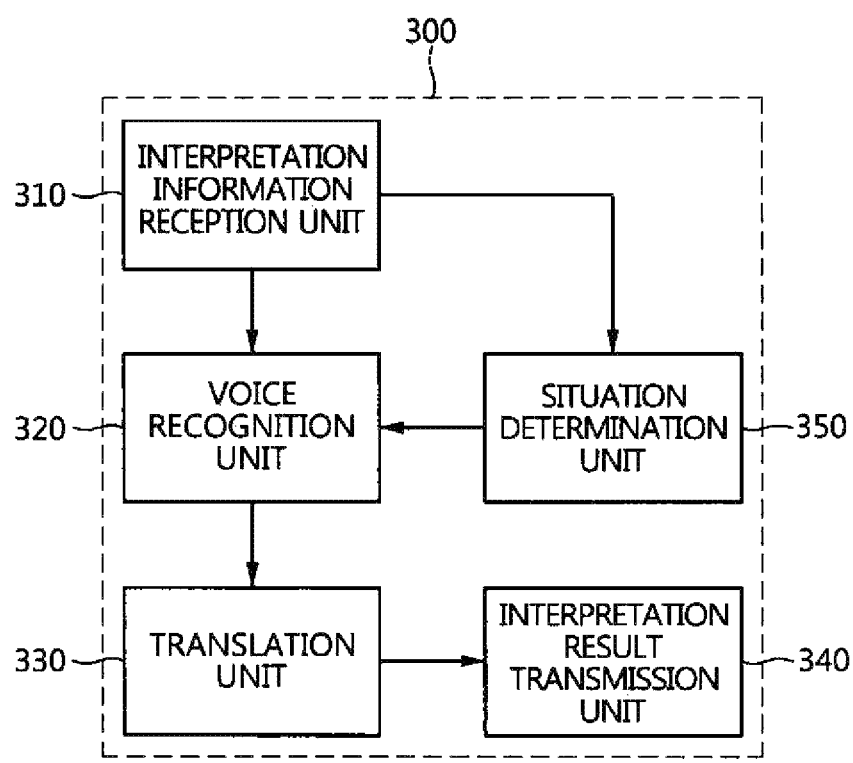
FIG. 11 is a block diagram of an interpretation server for hands-free automatic interpretation according to an embodiment of the present invention.

FIG. 11 is a block diagram of the interpretation server for hands-free automatic interpretation according to an embodiment of the present invention.

Referring to FIG. 11, the interpretation server 300 may include an interpretation information reception unit 310, a voice recognition unit 320, a translation unit 330, an interpretation result transmission unit 340 and a situation determination unit 350.

The interpretation information reception unit 310 receives interpretation information from the user terminal 200. The interpretation information may include situation information, such as information about a voice to be interpreted, information about the languages of a user and a counterpart, the current location of the user, and information about a background sound.

The voice recognition unit 320 may recognize voice information to be interpreted to and convert the recognized voice information into text.

If the received interpretation information includes information about the situation of a user, the situation determination unit 350 may determine the situation of a user using the situation information. For example, the situation determination unit 350 may roughly check the surrounding areas of the location where the user is now placed using information about the location of the user that belongs to the situation information, compare information about a background sound with Gaussian mixture models (GMM) for respective background sounds that have been previously modeled, and determine a model having the highest conformity degree to be a detailed situation.

In this case, if a detailed situation is determined by the situation determination unit 350, the voice recognition unit 320 may use an acoustic model suitable for the situation or precisely recognize voice by performing noise removal signal processing suitable for background noise.

When the voice recognition unit 320 converts the user's voice information into text, the translation unit 330 translates the text according to the language of the counterpart using the information about the languages of the user and counterpart.

In this case, the translation unit 330 may extract N-best recognition results or similarly intended sentences and generate the extracted results as error correction data.

The interpretation result transmission unit 340 sends the translation results or the error correction data to the user terminal 200 as interpretation results.

Figure 12:
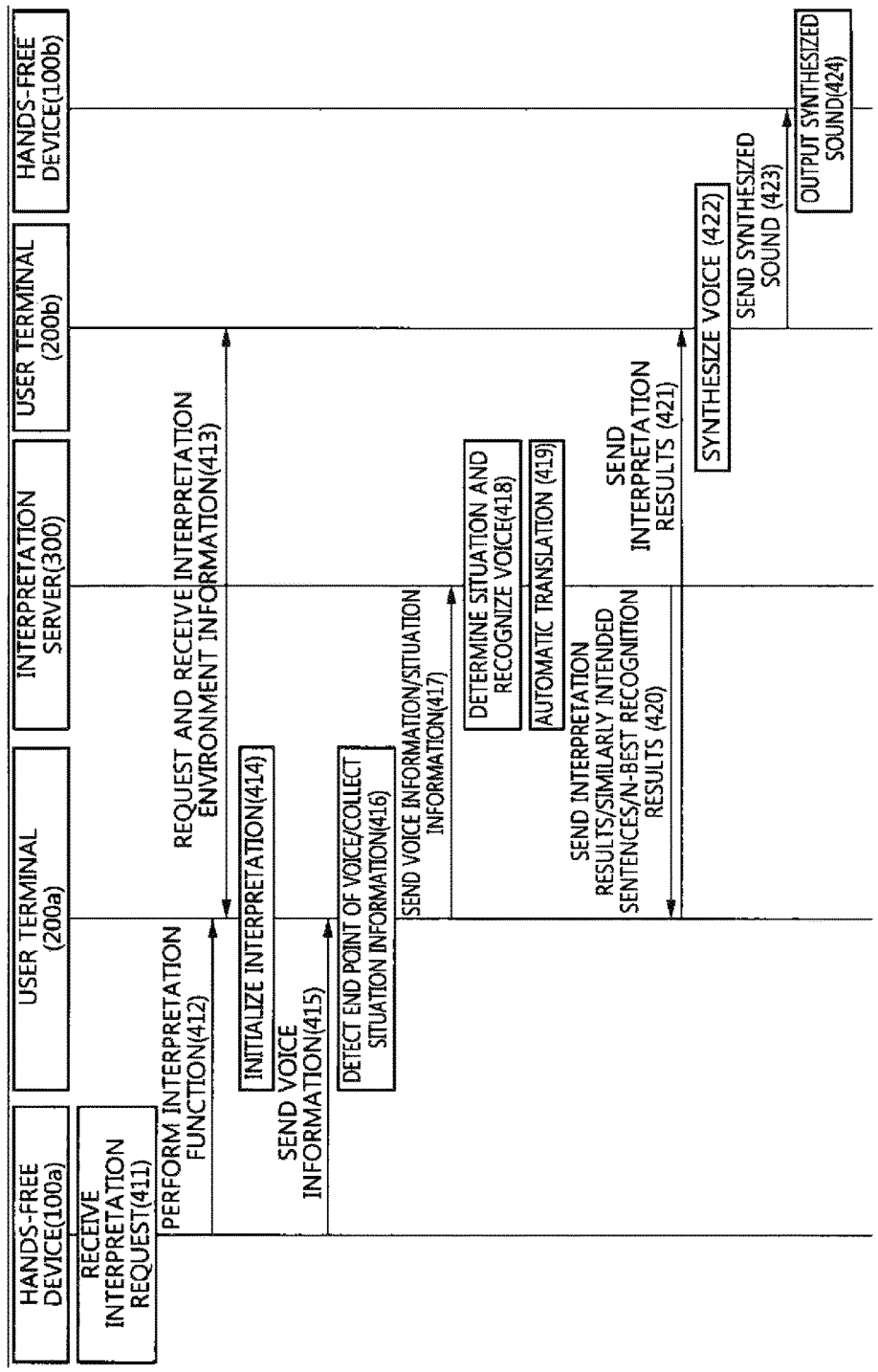
FIG. 12 is a flowchart illustrating a hands-free automatic interpretation method according to an embodiment of the present invention.

FIG. 12 is a flowchart illustrating a hands-free automatic interpretation method according to an embodiment of the present invention.

The hands-free automatic interpretation method of FIG. 12 may be an embodiment of an automatic interpretation method performed by the system for hands-free automatic interpretation of FIG. 1.

First, when an interpretation request is received from a user at step 411, the hands-free device 100a of the user may request a terminal 200a to perform an interpretation function at step 412. In this case, the hands-free device 100a may automatically run an interpretation app installed on the terminal 200a so that an interpretation environment is initialized.

When the interpretation function execution request is received from the hands-free device 100a, the terminal 200a may request interpretation environment information from the counterpart terminal 200b of a counterpart and receive information about the interpretation environment of the counterpart, for example, information about a language and information about gender, from the counterpart terminal 200b at step 413.

When the interpretation environment information is received from the counterpart terminal 200b at step 413, the terminal 200a may initialize the interpretation environment using the received environment information at step 414.

Thereafter, when the user's voice information to be interpreted is received from the hands-free device 100a, the terminal 200a may detect the end point of the received voice information at step 416 and send the voice information to the interpretation server 300 at step 417. In this case, the terminal 200a may collect situation information, such as information about the location of the user or information about a background sound, at step 416, and may send the voice information to the interpretation server 300 along with the situation information at step 417.

The interpretation server 300 may determine a situation based on the received voice information or situation information and recognize precise voice based on the determined situation at step 418. Furthermore, when the voice is recognized, the interpretation server 300 may convert the recognized voice into text.

The interpretation server 300 may translate the converted text into the language of the counterpart at step 419, and may send the translation results and error correction data to the terminal 200a at step 420.

When the interpretation results are received from the interpretation server 300, the terminal 200a may send the interpretation results to the user terminal 200b of the counterpart at step 421.

When the interpretation results are received from the terminal 200a, the user terminal 200b may synthesize the voice in accordance with the gender of the user based on set interpretation environment information at step 422, and may send the synthesized voice to a hands-free device 100b at step 423.

The hands-free device 100b of the counterpart may output the received synthesized voice at step 424.

Figure 13:
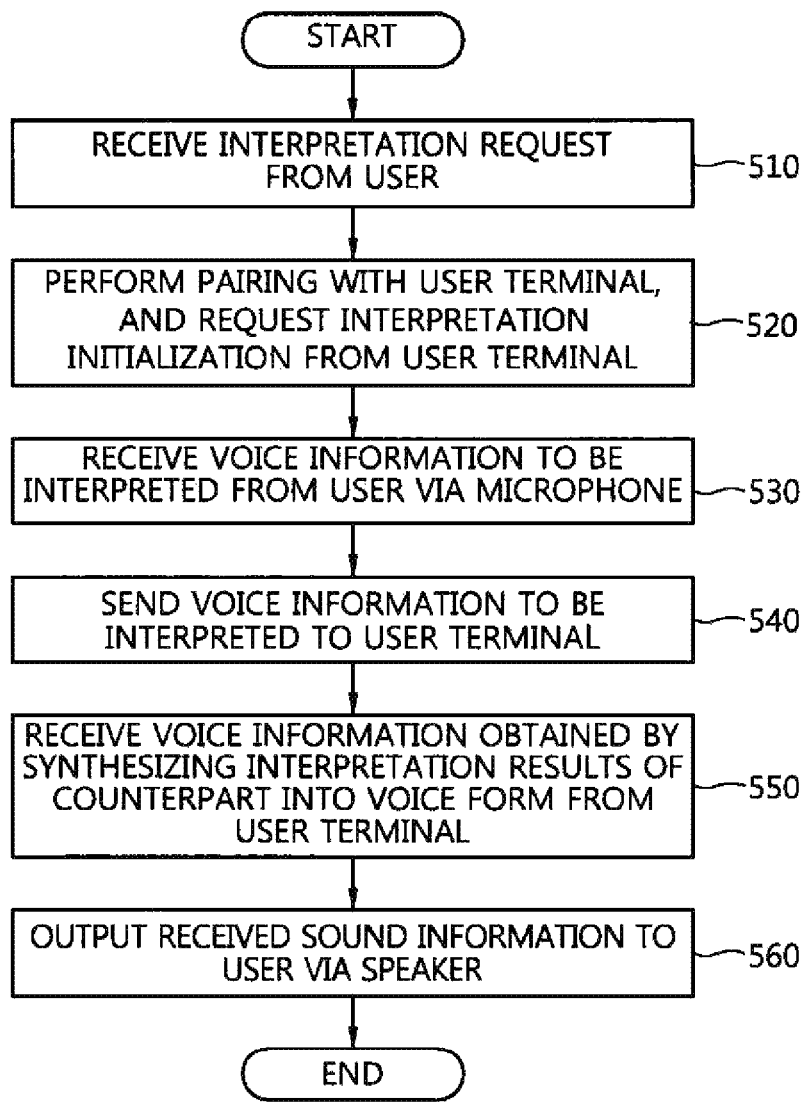
FIG. 13 is a flowchart illustrating an automatic interpretation method that is performed by the hands-free device according to an embodiment of the present invention.

FIG. 13 is a flowchart illustrating an automatic interpretation method that is performed by the hands-free device according to an embodiment of the present invention. The automatic interpretation method of FIG. 13 may be an embodiment of an automatic interpretation method that is performed by the hands-free device of FIG. 6.

Referring to FIG. 13, first, the hands-free device 100 receives an interpretation request from a user at step 510. In this case, the user may request an interpretation start by inputting a predefined voice as described above. Alternatively, the user may input the interpretation request via an interpretation request button separately included in the hands-free device 100.

When the interpretation request is received, the hands-free device 100 may perform pairing with the user terminal 200 and request interpretation initialization from the user terminal 200 at step 520. In this case, the hands-free device 100 may perform pairing via short-distance communication, such as Bluetooth, ZigBee or NFC communication. Furthermore, once the pairing with the user terminal 200 has been performed, the hands-free device 100 may run an interpretation app installed on the user terminal 200 and request the user terminal 200 to initialize an interpretation environment.

Once the initialization of the interpretation environment has been completed by the user terminal 200 and an interpretation function has been activated, the hands-free device 100 may receive voice information to be interpreted from the user via the microphone 110 at step 530. In this case, the microphone 110 may include two or more channels so that noise is easily removed from the received voice information in the user terminal 200 or the interpretation server. Furthermore, the microphone 110 may include a bone conduction microphone, and the end point of the received voice may be easily detected by the bone conduction microphone.

The hands-free device 100 may send the voice information to be interpreted to the user terminal 200 connected thereto at step 540.

The hands-free device 100 may receive voice information, obtained by synthesizing the interpretation results of a counterpart into a voice form, from the user terminal 200 at step 550 and output the received synthesized sound information to the user via the speaker at step 560.

Figure 14:
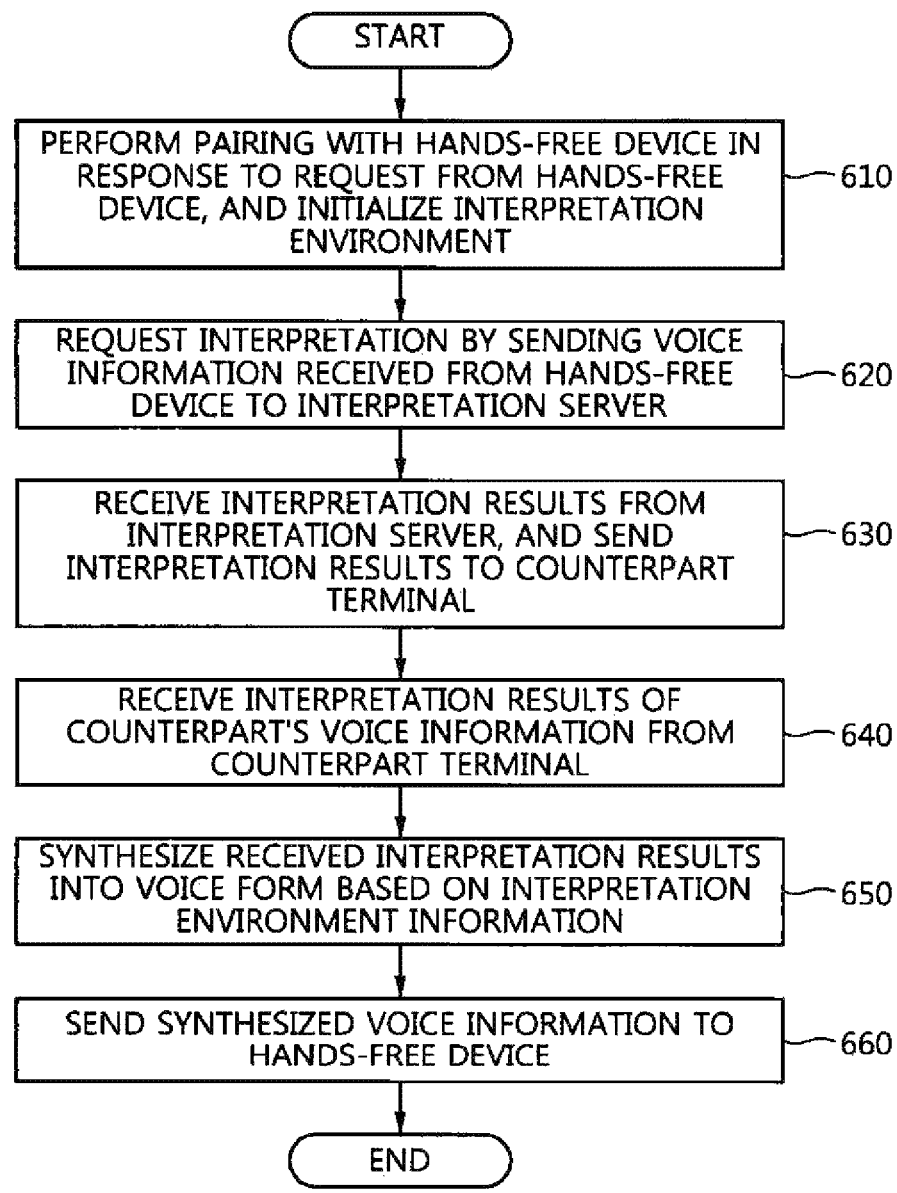
FIG. 14 is a flowchart illustrating an automatic interpretation method that is performed by the user terminal according to an embodiment of the present invention.

FIG. 14 is a flowchart illustrating an automatic interpretation method that is performed by the user terminal according to an embodiment of the present invention. The automatic interpretation method of FIG. 14 may be an embodiment of an automatic interpretation method that is performed by the user terminal 200 of FIG. 7.

Referring to FIG. 14, the user terminal 200 may perform pairing with the hands-free device 100 in response to a request from the hands-free device and initialize an interpretation environment at step 610. When a pairing request from the hands-free device 100 is detected, the user terminal 200 may approve the pairing request, may connect to the hands-free device 100, and may connect to the interpretation server 200 or a counterpart terminal over a mobile communication network or a short-distance communication network. Furthermore, the user terminal 200 may receive environment information, such as information about the language and gender of a counterpart, from the counterpart terminal and set the interpretation environment.

Thereafter, when voice information is received from the hands-free device 100, the user terminal 200 requests interpretation by sending the voice information to the interpretation server 300 at step 620. In this case, the user terminal 200 may send information about the languages of the user and counterpart to the interpretation server 300 along with the voice information. Furthermore, the user terminal 200 may collect situation information, such as the current location of the user or the background sound of the place where the user is placed, and send the collected situation information to the interpretation server along with the voice information.

Thereafter, when interpretation results are received from the interpretation server 300, the user terminal 200 may send the interpretation results to the counterpart terminal at step 630. In this case, if error correction data is included in the received interpretation results, the user terminal 200 may output the error correction data to an interface so that the user corrects the interpretation results, and may send the corrected interpretation results to the counterpart terminal.

Thereafter, the user terminal 200 may receive the interpretation results of the counterpart's voice information from the counterpart terminal at step 640, and may synthesize the received interpretation results into a voice form based on the interpretation environment information at step 660. In this case, when additional information, such as articulation speed or an emotional state, is received from the counterpart terminal, the user terminal 200 may synthesize the interpretation results into a voice form by incorporating the articulation speed or emotional state of the counterpart into the interpretation results.

Thereafter, the user terminal 200 may send the synthesized voice information to the hands-free device 100 at step 660. In this case, if the user terminal 200 is not connected to any hands-free device, the user terminal 200 may directly output the synthesized voice via its speaker.

As described above, those skilled in the art to which the present invention pertains will understand that the present invention may be implemented in various detailed forms without changing the technical spirit or indispensable characteristics of the present invention. It will be understood that the above-described embodiments are illustrative and not limitative from all aspects.

The invention claimed is:

1. A user terminal for hands-free automatic interpretation service, comprising:
one or more units which are executed by a processor using programs associated with least one non-transitory storage device, the one or more units comprising:
an interpretation environment initialization unit configured to perform pairing with a headset in response to a first pairing request from the headset, and to initialize an interpretation environment information;
an interpretation intermediation unit configured to send first interpretation results obtained by interpreting voice information of a first user in a first language received from the headset to a counterpart terminal of a second user, and to receive second interpretation results in the first language obtained by interpreting voice information of the second user in a second language from the counterpart terminal; and
an interpretation processing unit configured to synthesize the second interpretation results in the first language of the second user into synthesized voice information in the first language based on the initialized interpretation environment information when the second interpretation results are received from the counterpart terminal, and to send the synthesized voice information in the first language to the headset;
wherein the interpretation environment initialization unit performs a second pairing request to the counterpart terminal according to an interpretation request of the headset,
performs pairing with the counterpart terminal when receiving a pairing approval from the counterpart terminal in response to the second pairing request,
receives information about the second language of the second user from the counterpart terminal, and
sets the interpretation environment information with the counterpart terminal to perform the hands-free automatic interpretation service based on the information about the second language of the second user,
wherein the first interpretation results obtained by interpreting the first user's voice information include one or more of interpretation data, corresponding to the voice information interpreted in a text or voice form, and interpretation error correction data; and
wherein the error correction data includes one or more of similarly intended sentences and N-best recognition data.

2. The user terminal of claim 1, wherein the interpretation environment initialization unit comprises:

an environment information reception unit configured to receive the interpretation environment information, including one or more of pieces of information about a language and gender of the second user, from the counterpart terminal; and
an interpretation environment setting unit configured to set interpretation environment information, including one or more of information about an interpretation language and voice classification information, based on the received interpretation environment information.

3. The user terminal of claim 1, further comprising:
an additional information collection unit configured to collect additional information including one or more of user state information and personal information;
wherein the user state information includes one or more of an articulation speed and an emotional state extracted from the first or second user's voice information; and
wherein the personal information includes one or more of information about a name, nationality and an image input by the first or second user;
wherein the interpretation processing unit comprises a voice synthesis unit configured to synthesize the second interpretation results into a male or female voice based on the set voice classification information when the second interpretation results are received from the counterpart terminal,
wherein, when the additional information is further received from the counterpart terminal, the voice synthesis unit synthesizes the second interpretation results into a male or female voice based on the articulation speed and emotional state of the user into the second interpretation results based on the received additional information.

4. The user terminal of claim 1, wherein the interpretation intermediation unit comprises:
a server intermediation unit configured to send the voice information to an interpretation server when the voice information is received from the headset, and to receive the first interpretation results from the interpretation server; and
a terminal intermediation unit configured to send the received first interpretation results to the counterpart terminal in accordance with a predetermined interpretation protocol.

5. The user terminal of claim 4, further comprising:
a situation information collection unit configured to collect situation information including one or more of information about a current location of the first user and information about a background sound;
wherein the server intermediation unit sends the voice information received from the headset and the collected situation information to the interpretation server.

6. The user terminal of claim 1, wherein the interpretation processing unit comprises an interpretation correction unit configured to, if the error correction data is included in the second interpretation results, correct the interpretation data based on one or more pieces of information that belong to the error correction data and that are selected by the second user.

7. A computer-implemented method for hands-free automatic interpretation service, the method being performed by a user terminal, the method comprising:
performing pairing with a headset in response to a first pairing request from the headset, and initializing an interpretation environment information;
sending received voice information in a first language to an interpretation server when the voice information in the first language of a first user is received from the headset, and receiving first interpretation results in a second language from the interpretation server;
sending the received first interpretation results in the second language to a counterpart terminal of a second user;
receiving second interpretation results in the first language obtained by interpreting voice information of the second user in the second language from the counterpart terminal;
synthesizing the second interpretation results in the first language received from the counterpart terminal into synthesized voice information in the first language based on the initialized interpretation environment information; and
sending the synthesized voice information in the first language to the headset,
wherein initializing interpretation environment information comprising, performing a second pairing request to the counterpart terminal according to an interpretation request of the headset,
performing pairing with the counterpart terminal when receiving a pairing approval from the counterpart terminal in response to the second pairing request,
receiving information about the second language of the second user from the counterpart terminal, and
setting the interpretation environment information with the counterpart terminal to perform the hands-free automatic interpretation service based on the information about the second language of the second user,
if error correction data is included in the first interpretation results received from the interpretation server, outputting the error correction data to a display;
receiving one or more pieces of selection information, belonging to the error correction data, from the first user; and
correcting interpretation data based on the received selection information.

8. The method of claim 7, wherein initializing the interpretation environment comprises:
receiving interpretation environment information, including one or more of pieces of information about a language and gender of the second user, from the counterpart terminal; and
setting interpretation environment information, including one or more of information about an interpretation language and voice classification information, based on the received interpretation environment information.

9. The method of claim 7, further comprising collecting situation information including one or more of information about a current location of the user and information about a background sound;
wherein sending the received voice information of the first user to the interpretation server comprises sending the voice information, received from the headset, and the collected situation information to the interpretation server.

10. A headset for hands-free automatic interpretation service including multiple microphones and a speaker, the headset comprising:
an interpretation function performance unit configured to perform pairing with a user terminal in response to a first pairing request and an interpretation request from a first user, and to request the user terminal of the first user to initialize an interpretation environment information; and a control unit configured to control a communication unit so that the communication unit sends voice information of a user, received via the multiple microphones, to the user terminal, and to control the communication unit so that the communication unit outputs voice information, received from the user terminal, via the speaker, wherein the user terminal performs a second pairing request to a counterpart terminal of a second user according to an interpretation request of the headset, performs pairing with the counterpart terminal when receiving a pairing approval from the counterpart terminal in response to the second pairing request, receives information about the second language of the second user from the counterpart terminal, and sets the interpretation environment information with the counterpart terminal to perform the hands-free automatic interpretation service based on the information about the second language of the second user, a motion recognition unit configured to recognize a motion of the user using a motion recognition sensor using one or more of an acceleration sensor and a gyro sensor;

wherein the control unit controls a selection of error correction data output to a display of the user terminal based on the recognized motion.

11. The method of claim 7, wherein synthesizing the second interpretation results into the voice comprising, when additional information which includes an articulation speed and an emotional state of the second user is received from the counterpart terminal, synthesizing the second interpretation results into the voice by incorporating the articulation speed and the emotional state of a counterpart the second user into the second interpretation results, wherein synthesizing the second interpretation results into the voice comprises, when the second interpretation results are received from the counterpart terminal, synthesizing the second interpretation results into a male or female voice based on the set voice classification information.

12. The headset of claim 10, wherein the multiple microphones comprise one or more of a first microphone placed near a mouth of the user and a second microphone placed near an ear of the user to detect an end point of the voice information from the user terminal, wherein the interpretation function performance unit runs an interpretation app installed on the user terminal and requests the user terminal to initialize the interpretation environment, in response to an interpretation request from the user, wherein the interpretation function performance unit detects a counterpart terminal at a close location, and sends information about the detected counterpart terminal to the user terminal via the communication unit so that an interpretation environment with the counterpart terminal is initialized.

\* \* \* \* \*